(12) United States Patent
Gao

(10) Patent No.: US 9,410,634 B2
(45) Date of Patent: Aug. 9, 2016

(54) ANTI-SHAKE FLOW-LIMITING CUTOFF VALVE

(71) Applicant: ZHUHAI EDISON ECOTECH CORPORATION CO., LTD., Zhuhai (CN)

(72) Inventor: Dayong Gao, Zhuhai (CN)

(73) Assignee: Zhuhai Edison Ecotech Corp., Zhuhai (CN)

( * ) Notice: Subject to any disclaimer, the term of this patent is extended or adjusted under 35 U.S.C. 154(b) by 136 days.

(21) Appl. No.: 14/192,891

(22) Filed: Feb. 28, 2014

(65) Prior Publication Data

US 2015/0000769 A1  Jan. 1, 2015

(30) Foreign Application Priority Data

Jun. 28, 2013  (CN) .......................... 2013 1 0268499

(51) Int. Cl.
*E03B 1/00* (2006.01)
*F16K 17/30* (2006.01)
*F16K 15/14* (2006.01)

(52) U.S. Cl.
CPC .............. *F16K 17/30* (2013.01); *F16K 15/147* (2013.01); *Y10T 137/7785* (2015.04); *Y10T 137/7837* (2015.04); *Y10T 137/7842* (2015.04); *Y10T 137/7882* (2015.04); *Y10T 137/87917* (2015.04)

(58) Field of Classification Search
CPC .................. Y10T 137/7796; Y10T 137/7835; Y10T 137/87197; Y10T 137/7882; Y10T 137/7781
See application file for complete search history.

(56) References Cited

U.S. PATENT DOCUMENTS

| | | | | |
|---|---|---|---|---|
| 1,764,181 | A * | 6/1930 | Raetz ...................... | F04F 5/461 137/513.5 |
| 2,179,144 | A * | 11/1939 | Buttner ................... | F16L 29/00 137/515.5 |
| 2,502,525 | A * | 4/1950 | Krugler ................. | F16K 17/048 137/206 |
| 2,917,077 | A * | 12/1959 | Ziege .................... | F16K 47/023 137/514.7 |
| 3,794,077 | A * | 2/1974 | Fanshier ............... | F16K 15/063 137/513.3 |
| 4,524,805 | A * | 6/1985 | Hoffman ............... | F16K 15/147 137/846 |
| 5,215,178 | A * | 6/1993 | Bartlett .................. | F16K 17/30 137/460 |
| 5,551,476 | A * | 9/1996 | McGinnis ............... | F16K 17/30 137/498 |
| 7,644,726 | B1 * | 1/2010 | Achterman ............... | F16K 1/12 137/498 |
| 2003/0159730 | A1* | 8/2003 | Osborne ................. | F16K 17/34 137/71 |
| 2004/0221893 | A1* | 11/2004 | Johnson .................. | F16K 17/34 137/498 |

* cited by examiner

*Primary Examiner* — R. K. Arundale
(74) *Attorney, Agent, or Firm* — Platinum Intellectual Property LLP

(57) ABSTRACT

The present invention relates to an anti-shake flow-limiting cutoff valve, comprising a flow stop valve, a cutoff valve and a check structure. Said flow stop valve comprises a valve body, a valve seat, a piston and a biasing component. The check structure is arranged downstream said flow stop valve to prevent fluid from flowing back. In case of a sudden excessive water flow, the flow stop valve is closed under impact of excessive water pressure to block the water flow. At this time, since the liquid flow in the pipeline is suddenly blocked, the liquid flow remaining in a pipeline downstream the flow stop valve tends to form a reverse flow to impact the flow stop valve, thus shaking the flow stop valve, which may further lead to insufficient close or damage of the flow stop valve.

9 Claims, 4 Drawing Sheets

ANTI-SHAKE FLOW-LIMITING CUTOFF VALVE

CROSS-REFERENCE TO RELATED APPLICATION

This application claims the priority benefit of Chinese patent application No. 201310268499.X, filed on Jun. 28, 2013. The entirety of the above-mentioned patent application is hereby incorporated by reference herein and made a part of specification.

BACKGROUND OF THE INVENTION

1. Field of the Invention

The present invention relates to a valve body device, and particularly to an anti-shake flow-limiting cutoff valve.

2. Background of the Invention

When a sudden damage occurs to a faucet or other devices in a pipeline for supplying water or liquid, a lot of water may flow out continuously, i.e., the phenomenon of excess flow appears, which results in waste of water resource. In the prior art, a liquid main switch in the liquid pipeline is manually closed as a remedial measure against the sudden excess flow in the pipeline for supplying water or liquid. However, there is a reaction time between discovering the pipeline damage and closing the main switch, especially when no one is in the field at the time of the accident. In this case, the water resource is greatly wasted. Besides, since the spilling water will flood the floor and furniture in the house, this may bring about loss in property for the user. In a serious case, the spilling water may spread to the surrounding residents, thus leading to more serious consequences.

To this end, a flow stop valve has been proposed to prevent this from happening. The flow stop valve only permits a liquid flow lower than a threshold flux to pass, and does not permit an excess flow to pass. When the flux of liquid is too large, the flow stop valve will be automatically closed, even in an unattended case.

For example, U.S. Pat. No. 5,613,518A discloses a device for restricting excess flow against excess flow in a natural gas pipeline. The device for restricting excess flow is provided with a hollow chamber, which comprises an inlet end and an outlet end. A piston is arranged in the hollow chamber of the inlet end, and an annular shoulder is formed at an end of the hollow chamber which is close to the outlet. A spring is arranged between the piston and the annular shoulder, which applies a set threshold biasing force to said piston that tends to open the inlet end. An annular valve seat is further arranged at said outlet end, which is adapted to block the outlet end of said piston. A radial gap between the piston and the hollow chamber is an excess flow passing channel. Under the cooperation between the spring with a set threshold biasing force and the valve seat in the device for restricting excess flow, the fluid flow can be automatically cut off and the piston can be automatically reset. In a normal situation, under a force from the spring, the piston forms a gap with the valve seat of the inlet end. The fluid flows into the hollow chamber via the gap of inlet end. When a leakage event occurs upstream the device for restricting excess flow, i.e., when an excess flow occurs, the pressure produced by the excess flow exceeds the pressure produced by a fluid of a normal flux. Therefore, the piston will be pushed to move downstream, since the resistance of the spring is overcome. In this way, the piston moves until it rests against the annular valve seat, so that the flow path is closed. The fluid stops flowing to prevent the fluid from continuing to leak.

However, the prior art discussed above suffers from some problems. Firstly, in case of flow overload, said piston shakes at said annular valve seat, so that it is impossible to realize a timely and complete close between said piston and said annular valve seat. The reasons lie in the following aspects. When the piston is subject to an excess flow and thus closes the gap between said piston and said annular valve seat, the fluid flow downstream the piston is suddenly interrupted. At this time, the fluid remaining in the pipeline downstream the piston will flow in the reverse direction, i.e., in the direction from downstream to upstream. Under the resultant force of the impact force produced by the fluid which flows in the reverse direction and the inherent biasing force of the spring, the piston is further made to overcome the pressure produced by the excess flow, and doesn't rest closely against the annular valve seat, thus forming a gap. The above resultant force competes repeatedly with the pressure produced by the excess flow. As a result, the piston repeatedly rests closely against the annular valve seat and then forms a gap between the latter. The repeated processes appear as the above shaking phenomenon. Secondly, even after the shaking process is complete, the following problem still exists. Once the piston rests closely against the annular valve seat, the resting surface of the piston tends to be adsorbed to the annular valve seat. When the problem of excess flow is settled, the spring force of the spring will not always be able to separate the piston from the annular valve seat, thus affecting the normal flow of the gas/liquid flow.

BRIEF SUMMARY OF THE INVENTION

In order to overcome the problem of shaking during closing and difficulty during opening the gap between the piston and the annular valve seat in the device for restricting excess flow in the prior art, the present invention proposes an anti-shake flow-limiting cutoff valve with an anti-shake function.

It is another object of the present invention to provide an excess flow valve and a check means which operate stably and reliably.

According to the present invention, the technical solution for said anti-shake flow-limiting cutoff valve lies in an anti-shake flow-limiting cutoff valve, comprising: a valve body (2), which is a pipe with a through cavity and is provided with a liquid inlet (7) and a liquid outlet (8) at the respective end; a valve seat (6), which blocks said liquid outlet (8) and is provided with a liquid outlet through hole which communicates with said through cavity; a piston (3), which is axially movably arranged in said through cavity and is arranged between said liquid inlet (7) and said valve seat (6), wherein a liquid passing channel (13) which communicates with said liquid inlet (7) is arranged between the periphery of said piston (3) and an inner wall of said pipe; a biasing component, which applies a biasing force to said piston (3) to move said piston away from said valve seat (6); wherein an end of said piston (3) which is close to said valve seat (6) is provided with a blocking surface (311) for blocking said liquid outlet through hole;

and said anti-shake flow-limiting cutoff valve further comprises: a check valve, which is arranged downstream of the liquid outlet through hole of said valve seat (6), for passing the liquid which flows in a direction from the liquid inlet (7) to the liquid outlet (8), and stopping the liquid which flows in a direction from the downstream to the liquid outlet (8).

In said anti-shake flow-limiting cutoff valve, said check valve is a conical elastic sleeve (151), said elastic sleeve (151) has an open end of a large diameter at cone tail which is arranged in a cladding way at the outlet side of said liquid outlet through hole, and said elastic sleeve (151) has an open end of a small diameter at cone vertex which extends downstream.

In said anti-shake flow-limiting cutoff valve, said valve seat (6) is an adapter component, an end of the adapter component is inserted from said liquid outlet (8) to said through cavity, and the other end extends downstream for connecting to a liquid conduit at downstream; wherein said adapter component is provided with a through type circular hole at the middle part, said circular hole constitutes said liquid outlet through hole, and the diameter of said blocking surface (311) is larger than the diameter of the liquid inlet for said circular hole.

In said anti-shake flow-limiting cutoff valve, said circular hole is divided into an inlet circular hole segment which is near upstream and an outlet circular hole segment which is near downstream;

and said anti-shake flow-limiting cutoff valve further comprises:

a fixing ring (14), which is inserted into said inlet circular hole segment, wherein said blocking surface (311) has a diameter larger than that of the liquid inlet of an inner bore for said fixing ring (14), and said fixing ring (14) is further provided with a guide ring at the middle part;

a guide bar (10), which extends downstream from an end of said piston (3) which is close to said valve seat (6), and which is inserted in said guide ring for supporting said piston (3) at the middle of said through cavity and guiding said piston (3) to move axially;

wherein a gap part between said guide bar (10) and said guide ring forms said liquid outlet through hole.

In said anti-shake flow-limiting cutoff valve, a convex ring is arranged at the periphery of cone tail of said elastic sleeve (151), and an annular groove is arranged downstream of an inner wall of said circular hole that is close to said fixing ring (14), and said convex ring is snapped in said annular groove, so that said elastic sleeve (151) is fastened and said cone tail covers said gap part which act as said liquid outlet through hole.

In said anti-shake flow-limiting cutoff valve, said biasing component is a spring, an end of which is connected to said valve seat (6) and the other end is connected to said piston (3).

In said anti-shake flow-limiting cutoff valve, a sealing element (4) is arranged on the blocking surface (311) of said piston (3), and the surface of said fixing ring (14) that contacts said sealing element (4) is an uneven surface.

In said anti-shake flow-limiting cutoff valve, said uneven surface is a surface with minute slots.

In said anti-shake flow-limiting cutoff valve, an expansion member (312) is arranged at an end of said piston (3) which is distant form said valve seat (6), the outer diameter of the expansion member (312) is slightly smaller than the inner diameter of said pipe, a liquid accommodating chamber is arranged upstream said expansion member (312), and said liquid accommodating chamber communicates with said liquid passing channel (13) a through hole.

In said anti-shake flow-limiting cutoff valve, an opening is arranged in an end of said piston (3) which is distant from said valve seat (6), and said opening extends to communicate with said liquid passing channel (13).

In said anti-shake flow-limiting cutoff valve, it is further comprised of a cutoff valve which is arranged in an upstream pipeline of said liquid inlet (7).

Furthermore, the present invention also provides a check structure, comprising: a conical elastic sleeve (151), said conical elastic sleeve (151) has an open end of a large diameter at cone tail which is arranged in a cladding way upstream the liquid flow, and an open end of a small diameter at cone vertex which extends downstream.

In said check structure, said elastic sleeve is made from a plastic elastic material.

In said check structure, said check structure is installed in a pipeline downstream the cutoff valve.

The above technical solutions of the present invention at least offer the following advantages over the prior art.

In the present invention, the anti-shake flow-limiting cutoff valve can not only permit the water flow to pass freely in normal use, but also close automatically the cutoff valve in time to cut off the water supply when there is a sudden excess flow in the water supply pipeline. Moreover, since a check structure or a check valve is arranged at said flow-limiting cutoff valve, it is possible to prevent the water remaining at the end of the conduit from flowing in the reverse direction when the water flow suddenly interrupts, and thus to prevent shaking between the piston and the valve seat in said anti-shake flow-limiting cutoff valve. In this way, it is possible to effectively avoid the effect of a sudden closing of the anti-shake flow-limiting cutoff valve on automatic cutoff function of the anti-shake flow-limiting cutoff valve, thus ensuring that the automatic cutoff function of said anti-shake flow-limiting cutoff valve can work properly. On the other hand, since the contact surface between the fixing ring (14) in the circular hole of valve seat (6) and the sealing element (4) on said piston (3) is a surface with minute slots, it is facilitated to separate the fixing ring from the sealing element when the cutoff valve is closed. Therefore, the upstream pressure can be cut off by only closing the cutoff valve, so that the piston within the flow stop valve can be automatically reset under the biasing force from the spring, making it very convenient to use.

DETAILED DESCRIPTION OF THE EMBODIMENTS

In order to provide a better understanding of the present invention, the present invention will be described hereinafter with reference to drawings and embodiments.

Figure 1:
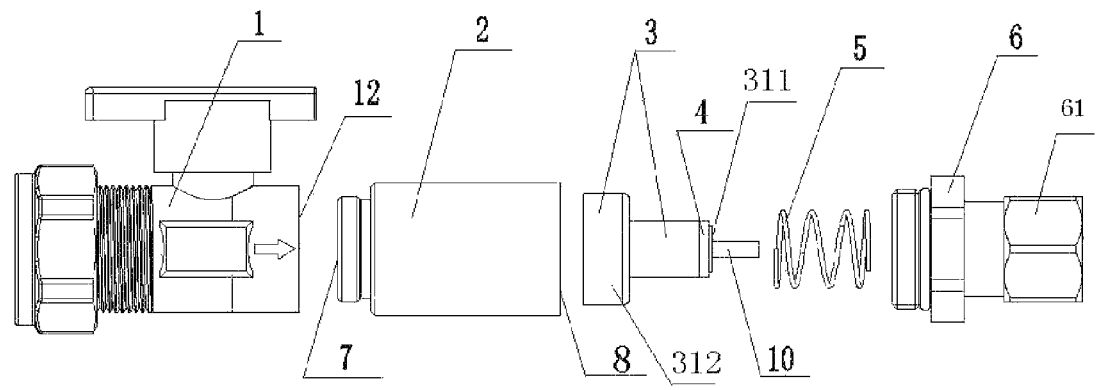
FIG. 1 is an exploded view showing respective component in the flow-limiting cutoff valve of the present invention (a check structure not shown here)

As shown in FIG. 1, in this embodiment, the anti-shake flow-limiting cutoff valve is installed in a liquid pipeline, like a household water pipeline. A cutoff valve 1 which can be closed or opened manually is arranged upstream the anti-shake flow-limiting cutoff valve. The cutoff valve 1 can be a ball valve, or other types of liquid valves. The cutoff valve 1 has the following function. In case that an excess flow occurs continuously, the user can manually close the cutoff valve 1 to cut off the excess flow. After the cutoff valve 1 is closed, the anti-shake flow-limiting cutoff valve can also be restored from the closed state to the opened state. After the cutoff valve 1 is closed, the flow stop valve can be automatically reset without any external force.

Figure 2:
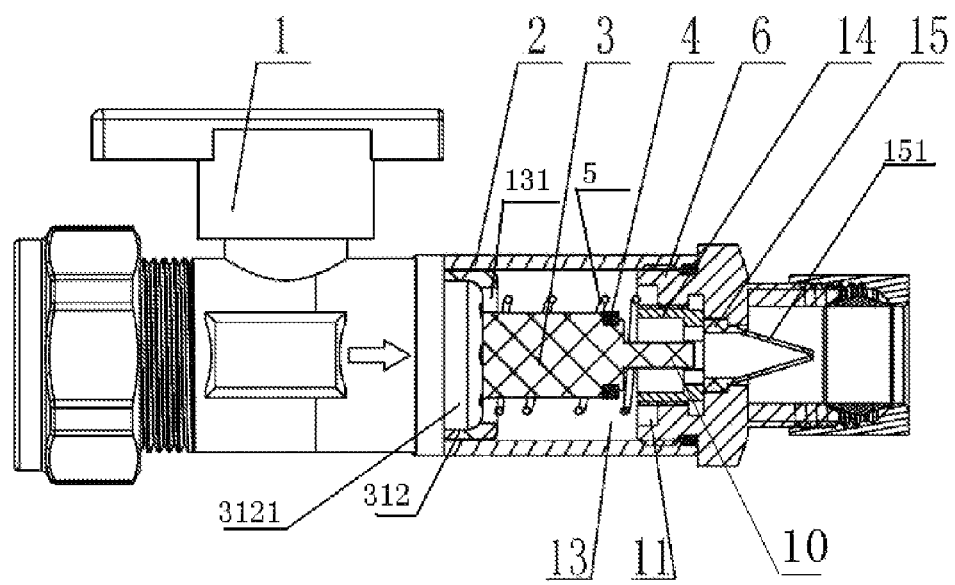
FIG. 2 is a cross-sectional view showing an anti-shake flow-limiting cutoff valve in an embodiment of the present invention, wherein a check structure is shown, and the anti-shake flow-limiting cutoff valve is in an opened state in which the liquid flow is permitted to flow normally.

The anti-shake flow-limiting cutoff valve comprises a flow stop valve and a check structure or check valve (not shown in FIG. 1) in the flow stop valve. The check valve is arranged downstream the flow stop valve, for the purpose of preventing the flow stop valve from shaking due to the reverse movement of remaining liquid flow in the downstream pipeline. Specifically, said flow stop valve comprises a valve body 2 which a cylinder structure. The valve body 2 is provided with a through cavity for passing the liquid. An opening at an end of the valve body 2 is connected with a liquid outlet section 12 upstream the cutoff valve 1, and thus the opening at this end is referred to a liquid inlet 7. An opening at the other end of the valve body 2 is connected with a downstream pipeline, and thus the opening at this end is referred to a liquid outlet 8. The surface of outer wall of the liquid inlet 7 can be provided with male threads, and an inner wall of the liquid outlet section 12 in the cutoff valve 1 can be provided with female threads. The outer wall of the liquid inlet 7 is screwed into the liquid outlet section 12 of the cutoff valve 1, thus establishing a pipeline connection between the valve body 2 and the cutoff valve 1. The liquid passing the cutoff valve 1 flows into the hollow chamber of the valve body 2. A piston 3 is inserted into the valve body 2. The piston 3 is arranged at the middle of the valve body 2 to leave a gap with the inner wall of the valve body 2 for permitting the liquid to flow therethrough. An end of the piston 3 which is close to the liquid inlet 7 rests near the edge of the liquid inlet 7. When the liquid flow passes the hollow chamber within the valve body 2, it produces an impact pressure on the piston 3, forcing the piston 3 to tend to move downstream. Reference is made to FIGS. 1-2. In the case shown in FIGS. 1-2, an expansion member 312 is arranged at an end of the piston 3 which is close to the liquid inlet 7, and has a diameter larger than that of the piston body. For example, the outer diameter of the expansion member 312 equals to the inner diameter of the valve body 2. A liquid accommodating chamber 3121 is arranged at the middle of the expansion member 312, which communicates with the gap between the piston body and the inner wall of the valve body via a through hole 131. Since the through hole 131 has a limited diameter, only a certain flux of liquid is permitted to pass. If the flux is too large, namely, an excess flow occurs, the through hole 131 is insufficient to pass the liquid in time, and the liquid will be blocked by the piston body, thus pushing the piston to move downstream.

A valve seat 6 is arranged at the liquid outlet 8 of the valve body 2. As the simplest form, the valve seat can be a protrusive board which extends from the upper/lower edges to the middle of the liquid outlet 8. This aims to reduce the diameter of the liquid outlet, so that the piston 3 can rest against the protrusive board to block the liquid outlet. As shown in FIGS. 1-2, the valve seat 6 is an adapter for liquid pipeline. The adapter is a connecting means for connecting two pipeline segments. A circular hole is arranged at the middle of the adapter for passing the liquid flow, while two ends of the adapter are connected with two pipeline segments respectively. The adapter as shown has such a step like structure that a portion to be inserted into the liquid outlet 8 has a relatively small diameter, the portion to be kept outside the liquid outlet 8 has a relatively large diameter, and these portions form a step. A connection end 61 of the adapter which is distant from the liquid outlet 8 is used for connecting to an external pipeline. Generally, the connection end 61 has a thread structure for connecting with an external pipeline thread.

The piston 3 is pushed by a liquid pressure from the excess flow, and directly rests against an end for insertion of the adapter, so as to block the circular hole at the end for insertion. In order to block in a more closely manner, an annular sealing element 4 can be arranged on the blocking surface 311 of the piston, so that the sealing element 4 rests against the end for insertion of the adapter to prevent the liquid from flowing out via the circular hole.

Figure 3:
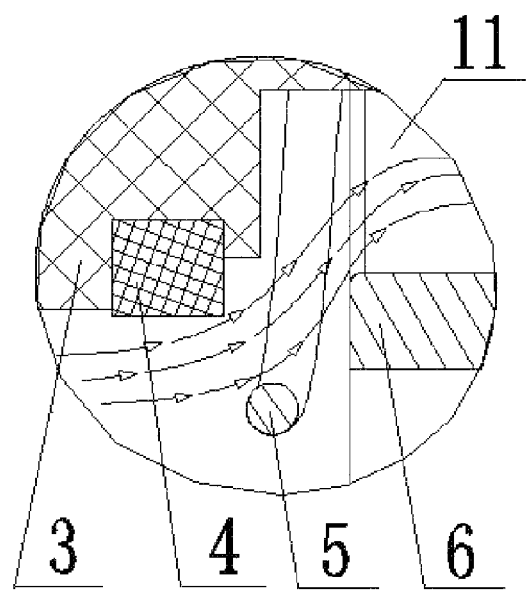
FIG. 3 is a locally enlarged view of FIG. 2, showing a liquid flow that normally flows between a gap between the piston (3) and the valve seat, when the flux in the anti-shake flow-limiting cutoff valve doesn't reach a preset value, namely when there is no excess flow.

As shown in FIG. 1, a biasing component 5 is further arranged at the piston 3, and can be made from an elastic sheet or spring. The biasing component 5 applies a force to the piston for moving away from the valve seat 6, so that in a normal situation, an excess flow gap exists between the piston 3 and the valve seat 6, as shown in FIGS. 2-3. When water with a normal flux passes the cutoff valve 1 and enters the anti-shake flow-limiting cutoff valve, a certain impact will also be produced on the piston 3. However, this impact force is counteracted by the spring 5, and is insufficient to push the piston 3 to move downstream. In this case, the liquid flow firstly enters the liquid accommodating chamber 3121, passes enters the excess flow passing channel 13 via the through hole 131, flows out of the valve seat via the gap between the piston 3 and the valve seat 6, and then enters a check valve which will be discussed hereinafter.

When an excess flow occurs, the spring force of the spring 5 is insufficient to counteract the impact force produced by the excess flow, the piston 3 will move downstream. During this process, the gap between the piston 3 and the valve seat 6 or the fixing ring 14 within the valve seat 6 gradually decreases. This indicates that the liquid flow passing channel is not smooth to a larger extent, and that the excess flow produces a stronger impact force. Therefore, the closing process in which the piston 3 is closed toward the valve seat 6 or the fixing ring 14 within the valve seat 6 is accelerated, until the piston 3 completely rests against the valve seat 6 or the fixing ring 14 within the valve seat 6, thus blocking the circular hole in the valve seat 6 or the fixing ring 14 within the valve seat 6.

FIGS. 1-2 show a case in which a fixing ring 14 is further inserted into the circular hole of the adapter component. The periphery of the fixing ring 14 has a size corresponding to the diameter of the circular hole. The fixing ring 14 only extends partially into the circular hole which is close to the piston. A resisting mesa is arranged at the middle of the adapter. When the fixing ring 14 is inserted into the circular hole, it is resisted by the resisting mesa to stop. The liquid flows downstream via the circular hole at the middle of the fixing ring 14. A guide ring is further arranged at the middle of the fixing ring 14. A guide bar 10 which is integrated with the piston 3 is inserted into the guide ring. The guide ring can not only support the piston 3 for forming a gap between the upper and lower inner wall of the valve body 2, but also guide the direction of movement for the piston 3. The guide ring is arranged coaxially with the valve body 2, thus limiting the piston 3 to move in the axial direction of the valve body 2. A liquid flow hold is arranged between the outer wall of the guide ring and the inner wall of the fixing ring 14, for making the liquid flow passing channel smooth.

An end of the spring 5 can sleeve the piston body at a position where the piston body intersects with the expansion end, and the other end is connected with the valve seat 6. For example, an annular groove 11 is arranged at an end of the adapter component which is close to the piston, so that the other end of the spring 5 is embedded into the annular groove 11.

To prevent the flow-limiting cutoff valve from shaking, a check valve is arranged downstream the valve seat. The check valve is arranged so that only the liquid flow which flows from upstream to downstream in the normal state is permitted to pass. When the liquid flows in the reverse direction, it is not permitted to pass. The check valve can prevent the liquid from flowing in the reverse direction, i.e., prevent the piston 3 from closing incompletely, and thus prevents the cutoff valve from shaking. When the excess flow occurs, the piston and the valve seat contact with each other, so that the liquid flow passing channel is closed. At this time, since the upstream valve is suddenly closed, the water remaining in the downstream tends to produce a reverse flow under the pressure of liquid. If there is no check valve, the liquid in the reverse flow will firstly impact the piston 3. The impact force of the reverse flow and the spring force of the spring 5 forms a resultant force, which forces a gap to form between the piston and the valve seat. Said resultant force and the pressure of the excess flow jointly act on the piston 3, so that the piston 3 can not be maintained at a stable state. The present inventors install a check valve downstream the piston, which prevents the liquid in the reverse flow from reaching the piston 3. That is, the liquid in the reverse flow will not impact the piston 3, which prevents shaking.

However, since the common check valve also suffers from the problem of being susceptible to damage and needing replacement, the present inventors devises a check structure. Such a check structure is simple in construction, excellent in performance, and very appropriate for installing downstream the piston 3.

Such a check structure comprises a conical elastic sleeve 151. The elastic sleeve 151 has an open end of a large diameter at cone tail which is arranged upstream the liquid flow in a cladding way. As shown in FIG. 2, the open end of a large diameter at cone tail rests against the edge downstream the fixing ring 14. Said elastic sleeve 151 has an open end of a small diameter at cone vertex which extends downstream. As shown in FIG. 2, the open end of a small diameter at cone vertex extends into a hollow chamber of an external pipeline to which the adapter is connected. A connecting part 15 is arranged at the periphery of the elastic sleeve 151 at the cone tail, and can be an annular rib. The annular rib is snapped into the annular groove in the inner wall of the circular hole, thus establishing a connection between the elastic sleeve 151 and the adapter component. Said elastic sleeve can be made from a plastic elastic material or a thin metal sheet.

Figure 4:
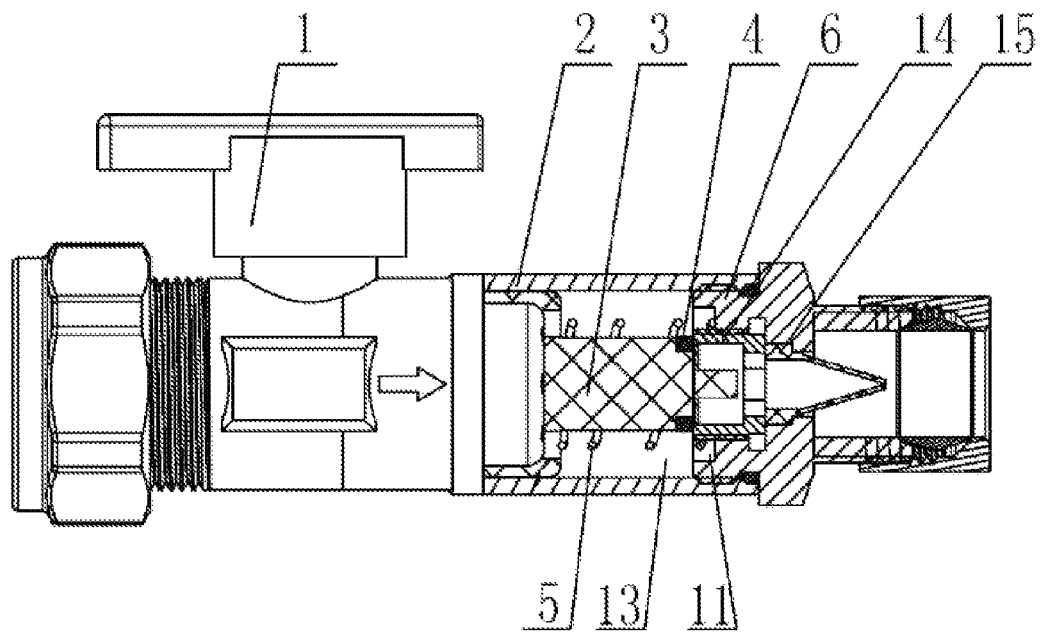
FIG. 4 is a cross-sectional view showing an anti-shake flow-limiting cutoff valve in an embodiment of the present invention, wherein a check structure is shown, and the anti-shake flow-limiting cutoff valve is in a closed state under impact of the excess flow.
Figure 5:
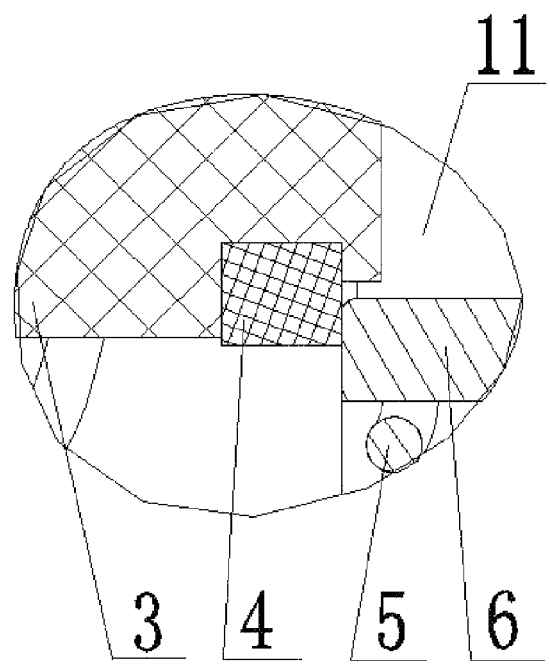
FIG. 5 is a locally enlarged view of FIG. 4, showing that the piston (3) rests against the valve seat, blocks the gap between the piston (3) and the valve seat (6), and thus closes the liquid flow passing channel, when an excess flow occurs in the anti-shake flow-limiting cutoff valve.

As shown in FIG. 4, in case of excess flow, the piston 3 rests against the edge of the fixing ring 14 under an impact of the water pressure of the excess flow. Therefore, the liquid inlet of the fixing ring 14 is blocked, thus cutting off the liquid flow. At this time, the check means 151 simultaneously acts to prevent the fluid from flowing back and impacting the piston 3. FIG. 5 shows details of the case in which the piston 3 rests against the edge of the fixing ring 14.

Figure 6:
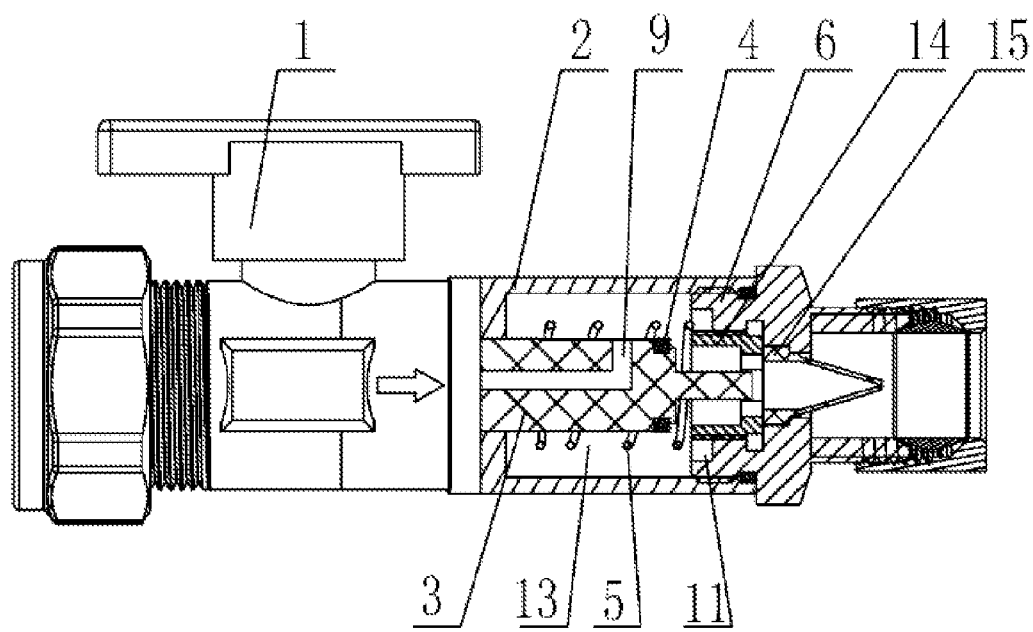
FIG. 6 is a cross-sectional view showing an anti-shake flow-limiting cutoff valve in another embodiment of the present invention, wherein a check structure is shown, and the anti-shake flow-limiting cutoff valve is in an opened state in which the liquid flow is permitted to flow normally.
Figure 7:
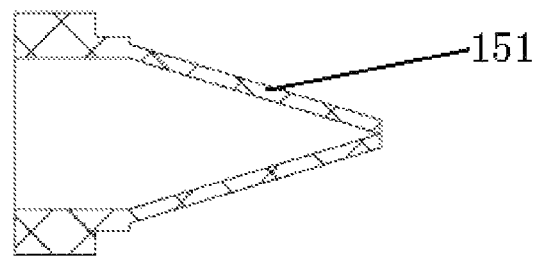
FIG. 7 is a schematic view showing the check structure.

FIG. 6 shows the piston 3 in another form. This piston 3 doesn't have the expansion member 312, and is embedded into a flange which extends from the upper/lower wall to the middle of the valve seat 2. A draining hole 9 is arranged at the middle of this piston 3, for communicating with a liquid flow passing channel between the liquid outlet section 12 of the cutoff valve 1 and the excess flow passing channel 13. Here, the draining hole 9 replaces the through hole 131 in the previous example of piston, but they play the same role.

Figure 8:
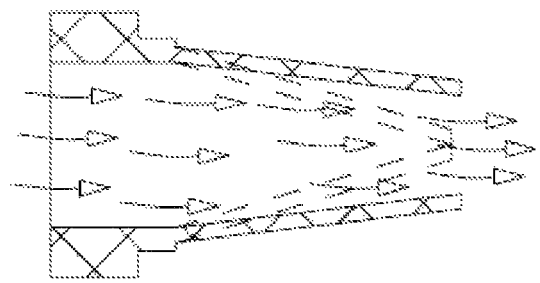
FIG. 8 is a schematic view showing a state in which the liquid smoothly passes the check structure, when the liquid flows in a forward direction.
Figure 9:
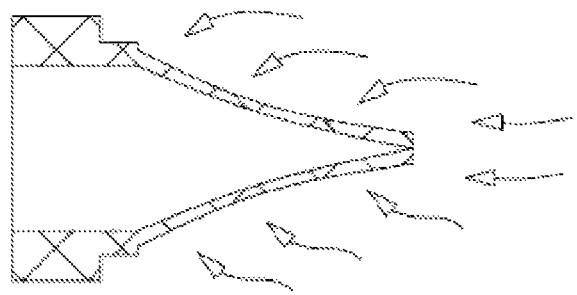
FIG. 9 is a schematic view showing a state in which the liquid is blocked by the check structure, when the liquid flows in a reverse direction.

As can be seen from FIG. 8, when the liquid flow normally flows from upstream to downstream, the liquid pressure can enlarge the small hole at the cone vertex so that the liquid flows out smoothly, due to elasticity of the elastic sleeve 151. In contrast, as shown in FIG. 9, when the liquid flow tries to flow downstream to upstream, the outer wall of the elastic sleeve will be squeezed, so that the small hole at the cone vertex is completely closed and the liquid is not permitted to pass.

Alternatively, the draining hole 9 can be provided as a curved passing channel with a right-angled turning, as shown in FIG. 6.

Obviously, the above embodiments have been described only in order to provide a detailed description for the present invention, and should not be considered as limitations to the manner of implementation. Given the above description, the ordinary skilled in the art can further make various alterations and modifications to the present invention. It is no necessary to make an exhaustive listing of all implementations. These alterations and modifications which can apparently be derived from the present disclosure still fall within the scope of protection of the present invention.

The invention claimed is:
1. An anti-shake flow-limiting cutoff valve, comprising:
a valve body (2), which is a pipe with a through cavity and is provided with a liquid inlet (7) and a liquid outlet (8) at a respective end;
a valve seat (6), which blocks said liquid outlet (8) and is provided with a liquid outlet through hole which communicates with said through cavity;
a piston (3), which is axially movably arranged in said through cavity and is arranged between said liquid inlet (7) and said valve seat (6), wherein a liquid passing channel (13) which communicates with said liquid inlet (7) is arranged between the periphery of said piston (3) and an inner wall of said pipe;
a biasing component, which applies a biasing force to said piston (3) to move said piston (3) away from said valve seat (6),
wherein an end of said piston (3) which is close to said valve seat (6) is provided with a blocking surface (311) for blocking said liquid outlet through hole;
a check valve, which is arranged downstream of the liquid outlet (8) through hole of said valve seat (6), for passing liquid which flows in a direction from the liquid inlet (7) to the liquid outlet (8),
wherein said valve seat (6) is an adapter component, an end of the adapter component is inserted from said liquid outlet (8) to said through cavity, and a second end extends downstream for connecting to a liquid conduit at downstream, wherein said adapter component is provided with a through type circular hole, and said through type circular hole constitutes said liquid outlet through hole, and wherein said through type circular hole is divided into an inlet circular hole segment which is near upstream and an outlet circular hole segment which is near downstream; and a fixing ring (14), which is inserted into said inlet circular hole segment, wherein said blocking surface (311) has a diameter larger than that of a liquid inlet of an inner bore for said fixing ring (14), and said fixing ring (14) is further provided with a guide ring; and a guide bar (10), which extends downstream from an end of said piston (3) which is close to said valve seat (6), and which is inserted in said guide ring for supporting said piston (3) at the middle of said through cavity and guiding said piston (3) to move axially, wherein a gap part between said guide bar (10) and said guide ring forms said liquid outlet through hole.

2. The anti-shake flow-limiting cutoff valve of claim 1, wherein said check valve is a conical elastic sleeve (151), said conical elastic sleeve (151) has an open end of a first diameter at a cone tail of said conical elastic sleeve (151) which is arranged in a cladding way at the outlet side of said liquid outlet through hole, and said conical elastic sleeve (151) has an open end of a second diameter at a cone vertex of said conical elastic sleeve (151) which extends downstream.

3. The anti-shake flow-limiting cutoff valve of claim 2, wherein a convex ring is arranged at the periphery of cone tail of said conical elastic sleeve (151), and an annular groove is arranged downstream of an inner wall of said through type circular hole that is close to said fixing ring (14), and said convex ring is snapped in said annular groove, so that said conical elastic sleeve (151) is fastened and said cone tail covers said gap part which act as said liquid outlet through hole.

4. The anti-shake flow-limiting cutoff valve of claim 1, wherein said biasing component is a spring, an end of which is connected to said valve seat (6) and a second end is connected to said piston (3).

5. The anti-shake flow-limiting cutoff valve of claim 3, wherein a sealing element (4) is arranged on the blocking surface (311) of said piston (3), and the surface of said fixing ring (14) that contacts said sealing element (4) is an uneven surface.

6. The anti-shake flow-limiting cutoff valve of claim 5, wherein said uneven surface is a surface with minute slots.

7. The anti-shake flow-limiting cutoff valve of claim 6, wherein an expansion member (312) is arranged at an end of said piston (3) which is distant form said valve seat (6), the outer diameter of the expansion member (312) is slightly smaller than the inner diameter of said pipe, a liquid accommodating chamber is arranged upstream said expansion member (312), and said liquid accommodating chamber communicates with said liquid passing channel (13) a through hole.

8. The anti-shake flow-limiting cutoff valve of claim 6, wherein an opening is arranged in an end of said piston (3) which is distant from said valve seat (6), and said opening extends to communicate with said liquid passing channel (13).

9. The anti-shake flow-limiting cutoff valve of claim 6, further comprising:

a cutoff valve, which is arranged in an upstream pipeline of said liquid inlet (7).

* * * * *